US012798144B2

(12) United States Patent
Wen et al.

(10) Patent No.: US 12,798,144 B2
(45) Date of Patent: Nov. 17, 2026

(54) CUTTING APPARATUS, CUTTING METHOD, AND BATTERY MANUFACTURING DEVICE

(71) Applicant: CONTEMPORARY AMPEREX TECHNOLOGY (HONG KONG) LIMITED, Hong Kong (CN)

(72) Inventors: Zhihua Wen, Ningde (CN); Yitai Guo, Ningde (CN); Keqiang Li, Ningde (CN); Cong Zhang, Ningde (CN); Yunru Shi, Ningde (CN); Zhongdi Wang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 140 days.

(21) Appl. No.: 18/795,763

(22) Filed: Aug. 6, 2024

(65) Prior Publication Data

US 2024/0391124 A1 Nov. 28, 2024

Related U.S. Application Data

(63) Continuation of application No. PCT/CN2023/073611, filed on Jan. 28, 2023.

(30) Foreign Application Priority Data

Feb. 25, 2022 (CN) ........................ 202210182969.X

(51) Int. Cl.
*B26D 7/26* (2006.01)
*B26D 1/06* (2006.01)
*H01M 4/04* (2006.01)

(52) U.S. Cl.
CPC ........... *B26D 7/2628* (2013.01); *B26D 1/065* (2013.01); *H01M 4/04* (2013.01)

(58) Field of Classification Search
CPC ....... B26D 1/065; B26D 1/085; B26D 7/2628
(Continued)

(56) References Cited

U.S. PATENT DOCUMENTS 253,301 A * 2/1882 Marsh et al. ........ B26D 7/2628
83/582
432,108 A * 7/1890 Anderson ................ B26F 1/14
83/699.41

(Continued)

FOREIGN PATENT DOCUMENTS

CN 102306743 A 1/2012
CN 102958655 A 3/2013

(Continued)

OTHER PUBLICATIONS

The World Intellectual Property Organization (WIPO) International Search Report and Written Opinion for PCT/CN2023/073611 May 27, 2023 12 Pages (including translation).

(Continued)

*Primary Examiner* — Sean M Michalski
(74) *Attorney, Agent, or Firm* — ANOVA LAW GROUP, PLLC

(57) ABSTRACT

A cutting apparatus includes: a pair of cutting blades; a drive mechanism configured to drive the pair of cutting blades to close or open with respect to each other in a first direction; and a gap adjustment mechanism configured to drive at least one of the pair of cutting blades to move along a second direction before the drive mechanism drives the pair of cutting blades to open, so as to enlarge a movement gap between the pair of cutting blades; where the first direction intersects with the second direction.

17 Claims, 5 Drawing Sheets

(58) Field of Classification Search
USPC .......................................................... 83/699.11
See application file for complete search history.

(56) References Cited

U.S. PATENT DOCUMENTS

| | | | | | |
|---|---|---|---|---|---|
| 3,148,575 | A * | 9/1964 | Thyng | B26D 7/2628 83/699.41 | |
| 3,233,494 | A * | 2/1966 | Rupp | B26D 7/2628 83/699.41 | |
| 3,289,517 | A * | 12/1966 | Brombach | B23D 35/005 83/699.41 | |
| 3,340,758 | A * | 9/1967 | Peterson | B26D 7/2614 83/697 | |
| 3,541,911 | A * | 11/1970 | Schiffers | B23D 35/008 83/699.11 | |
| 4,198,006 | A * | 4/1980 | Rolfe | B02C 18/16 324/207.16 | |
| 4,505,172 | A * | 3/1985 | Deguchi | B26D 7/2628 83/636 | |
| 4,759,248 | A * | 7/1988 | Muller | B01J 2/22 83/699.61 | |
| 4,920,843 | A * | 5/1990 | Stromberg | B26D 7/2628 83/346 | |
| 5,088,370 | A * | 2/1992 | Kondo | B26D 7/24 83/528 | |
| 5,740,710 | A * | 4/1998 | Gross | B26D 7/22 83/462 | |
| 6,152,007 | A * | 11/2000 | Sato | B26D 1/0006 83/636 | |
| 6,532,790 | B2 * | 3/2003 | Frenken | B25B 27/10 81/421 | |
| 8,562,229 | B2 * | 10/2013 | Inaba | B26D 1/085 400/621 | |
| 10,940,658 | B2 * | 3/2021 | Lemmens | B26D 7/22 | |
| 2016/0107249 | A1 * | 4/2016 | Cartwright | B23D 15/04 702/158 | |
| 2025/0289201 | A1 * | 9/2025 | Totani | B31B 70/10 | |

FOREIGN PATENT DOCUMENTS

| | | | |
|---|---|---|---|
| CN | 106182109 | A | 12/2016 |
| CN | 108724977 | A | 11/2018 |
| CN | 110000273 | A | 7/2019 |
| CN | 110528191 | A | 12/2019 |
| CN | 210182521 | U | 3/2020 |
| CN | 211966084 | U | 11/2020 |
| CN | 213108727 | U | 5/2021 |
| CN | 213832389 | U | 7/2021 |
| EP | 1724077 | A1 | 11/2006 |
| JP | 2016100093 | A | 5/2016 |

OTHER PUBLICATIONS

State Intellectual Property Office of China Notice of Grant of Invention Patent Right for Application No. 202210182969.X Oct. 22, 2025 9 pages (including translation).
State Intellectual Property Office of China Notice of Grant of Utility Model Patent Right for Application No. 202390000207 Aug. 5, 2025 3 pages (including translation).

* cited by examiner

CUTTING APPARATUS, CUTTING METHOD, AND BATTERY MANUFACTURING DEVICE

CROSS-REFERENCE TO RELATED APPLICATIONS

This application is a continuation of International Application No. PCT/CN2023/073611, filed on Jan. 28, 2023, which claims priority to Chinese Patent Application (No. 202210182969.X), filed on Feb. 25, 2022 and entitled "CUTTING APPARATUS, CUTTING METHOD, AND BATTERY MANUFACTURING DEVICE", the entire contents of both of which are incorporated herein by reference.

TECHNICAL FIELD

This application relates to the field of battery manufacturing technologies, and specifically, to a cutting apparatus, a cutting method, and a battery manufacturing device.

BACKGROUND

With the development of new energy vehicles, the technological level of the lithium battery industry is also increasing, and the industrial manufacturing level of batteries is becoming more mature.

In the battery manufacturing process, it is needed to use a cutting apparatus to cut electrode plates, but the service life of a cutting blade of the cutting apparatus is very short.

SUMMARY

In view of this, this application proposes a cutting apparatus, a cutting method, and a battery manufacturing device, so as to prolong the service life of the cutting apparatus.

According to a first aspect, an embodiment of this application proposes a cutting apparatus. The cutting apparatus includes: a pair of cutting blades; a drive mechanism configured to drive the pair of cutting blades to close or open with respect to each other in a first direction; and a gap adjustment mechanism configured to drive at least one of the pair of cutting blades to move along a second direction before the drive mechanism drives the pair of cutting blades to open, so as to enlarge a movement gap between the pair of cutting blades; where the first direction intersects with the second direction.

In this embodiment of this application, the cutting apparatus is provided with the gap adjustment mechanism, so that at least one of the pair of cutting blades can be driven to move along the second direction before the pair of cutting blades open, so as to enlarge the movement gap between the pair of cutting blades. In addition, the pair of cutting blades do not come into contact with each other in a process of opening, so that the wear of the pair of cutting blades in a process of cutting a material strip is reduced, thereby prolonging the service life of the cutting apparatus.

According to some embodiments of this application, the first direction is perpendicular to the second direction.

In the foregoing solution, a direction in which the pair of cutting blades close with respect to each other is perpendicular to an adjustment direction of the movement gap between the cutting blades, allowing for a simple structure of the cutting apparatus and facilitating its design and processing molding.

According to some embodiments of this application, the gap adjustment mechanism is further configured to drive at least one of the pair of cutting blades to reset in an opposite direction of the second direction before the drive mechanism drives the pair of cutting blades to close.

In the foregoing solution, after the pair of cutting blades close, the gap adjustment mechanism can also drive at least one of the pair of cutting blades to reset, so that the movement gap between the pair of cutting blades is restored to a preset value, allowing the pair of cutting blades to open again with the preset movement gap to cut the material strip, thereby ensuring the cutting quality of the material strip.

According to some embodiments of this application, the pair of cutting blades are a first cutting blade and a second cutting blade; the drive mechanism is configured to drive the first cutting blade to reciprocate in the first direction; and the gap adjustment mechanism is configured to drive the second cutting blade to move along the second direction and reset in the opposite direction of the second direction.

In the foregoing solution, the first cutting blade reciprocates in the first direction to approach or leave the second cutting blade, allowing the pair of cutting blades to close or open with respect to each other. The second cutting blade moves along the second direction to enlarge the movement gap between the pair of cutting blades, and resets in the opposite direction of the second direction to restore the gap between the pair of cutting blades to the preset value. The drive mechanism and the gap adjustment mechanism respectively act on two cutting blades of the pair of cutting blades, allowing for a simple structure of the cutting apparatus and facilitating its design and processing molding.

According to some embodiments of this application, the gap adjustment mechanism includes: a drive member configured to drive the second cutting blade to move along the second direction; and an elastic reset member configured to drive the second cutting blade to reset in the opposite direction of the second direction.

In the foregoing solution, the drive member drives the second cutting blade to move so as to enlarge the movement gap between the pair of cutting blades, so that the movement gap between the pair of cutting blades can be reliably enlarged, preventing the pair of cutting blades from being worn again in the process of opening. The elastic reset member drives the second cutting blade to reset, so that the second cutting blade can be driven to approach the first cutting blade through an elastic force when the drive member is relieved of force, allowing the movement gap to be restored to the preset value. This features simple structure and is easy to implement.

According to some embodiments of this application, the cutting apparatus further includes a base, where the drive mechanism is fixed to the base, the drive mechanism is configured to drive the first cutting blade to move relative to the base, the second cutting blade is slidably mounted to the base along the second direction, and the gap adjustment mechanism is configured to drive the second cutting blade to move relative to the base.

In the foregoing solution, the drive mechanism and the second cutting blade are both mounted to the base, enabling the cutting apparatus to be connected to an external frame through the base and reducing the difficulty of connecting the cutting apparatus to the external frame.

According to some embodiments of this application, the base is provided with a mounting hole. The cutting apparatus further includes a guide rod extending along the second direction, the guide rod slidably running through the mounting hole, and one end of the guide rod being connected to the second cutting blade, where the drive member fits around the guide rod.

In the foregoing solution, the guide rod is fixedly connected to the second cutting blade, and the guide rod is slidably mounted to the base. In this way, when driving the second cutting blade to move relative to the base, the drive member can limit the movement of the second cutting blade along the second direction. In addition, the drive member fits around the guide rod, allowing the drive member to drive the second cutting blade along the second direction to move relative to the base. This features simple structure and convenient assembly.

According to some embodiments of this application, the guide rod is provided with a limiting portion at another end, the elastic reset member fits around the guide rod, and two ends of the elastic reset member respectively abut against the limiting portion and the base.

In the foregoing solution, the elastic reset member fits around the guide rod, so that the elastic reset member can abut against between the limiting portion and the base in the second direction, and thus the elastic reset member acts on the limiting portion to drive the second cutting blade fixedly connected to the guide rod to reset in the opposite direction of the second direction.

According to some embodiments of this application, the elastic reset member and the drive member are both disposed in the mounting hole, a protrusion is provided on an inner wall of the mounting hole, and two sides of the protrusion respectively abut against the elastic reset member and the drive member.

In the foregoing solution, the protrusion is provided on the inner wall of the mounting hole, and the two sides of the protrusion respectively abut against the elastic reset member and the drive member. This allows the elastic reset member and the drive member to be both accommodated in the mounting hole, ensuring a compact structure for the gap adjustment mechanism that occupies a small space. In addition, one end of the elastic reset member and one end of the drive member both abut against the protrusion for a direct contact with the base.

According to some embodiments of this application, the protrusion is an annular protrusion extending along a circumferential direction of the mounting hole.

In the foregoing solution, the protrusion is set as the annular protrusion extending along the circumferential direction of the mounting hole, allowing one end of the elastic reset member and one end of the drive member to both abut against the protrusion uniformly in the circumferential direction of the mounting hole.

According to some embodiments of this application, the cutting apparatus further includes: a slider fixed to the second cutting blade; and a guide member fixed to the base and fitting with the slider, the guide member being configured to guide the slider to move along the second direction; where one end of the guide rod is connected to the slider.

In the foregoing solution, the second cutting blade is in sliding fit with the guide member in the second direction through the slider, which can simply and reliably implement a sliding fit between the second cutting blade and the base.

According to some embodiments of this application, the drive member is a piece of piezoelectric ceramic.

In the foregoing solution, the piezoelectric ceramic undergoes tiny deformation under the action of an electric field, has quick response, and can implement high-accuracy gap adjustment in a short time and drive the second cutting blade to move with high accuracy in a timely manner, so as to accurately enlarge the movement gap between the pair of cutting blades.

According to some embodiments of this application, the cutting apparatus further includes a guide plate fixed to the second cutting blade and configured to guide a material strip into a gap between the first cutting blade and the second cutting blade.

In the foregoing solution, the guide plate can guide the material strip into the gap between the first cutting blade and the second cutting blade, so that the first cutting blade and the second cutting blade cut the material strip in a thickness direction of the material strip, thereby reducing the area of a cut section of the material strip and improving the cutting quality of the material strip.

According to some embodiments of this application, the drive mechanism is a voice coil motor.

In the foregoing solution, with the advantages of small size, high speed, and high acceleration response, the voice coil motor can not only occupy a small installation space, but also drive the first cutting blade with high accuracy to reciprocate at a high speed in the first direction.

This can not only improve the cutting efficiency of the material strip, but also reduce the amount of metal dust generated in the cutting process due to a high-speed cutting condition, thereby improving the cutting quality of the material strip and prolonging the service life of the cutting apparatus.

According to some embodiments of this application, the drive mechanism is provided in two, and the two drive mechanisms are apart from each other in a third direction, the third direction being perpendicular to the first direction and the second direction In the foregoing solution, the two drive mechanisms are apart from each other in the third direction and can apply a uniform force to the first cutting blade in the third direction, avoiding that the first cutting blade skews due to a non-uniform force applied in the third direction, which in turn reduces the cutting quality of the material strip.

According to a second aspect, an embodiment of this application proposes a cutting method. The cutting method includes:

- driving a pair of cutting blades to close with respect to each other in a first direction so as to cut a material strip;
- driving at least one of the pair of cutting blades to move along a second direction so as to enlarge a movement gap between the pair of cutting blades, where the first direction intersects with the second direction; and
- driving the pair of cutting blades to open in an opposite direction of the first direction.

In the process of cutting the material strip by using the cutting method according to this embodiment of this application, the movement gap between the pair of cutting blades is enlarged before the pair of cutting blades open, so that the pair of cutting blades do not come into contact with each other in the process of opening, and the wear of the pair of cutting blades in the process of cutting the material strip is reduced, thereby prolonging the service life of the cutting apparatus.

According to some embodiments of this application, after driving the pair of cutting blades to open in an opposite direction of the first direction, the cutting method further includes:

- driving at least one of the pair of cutting blades to reset in an opposite direction of the second direction.

In the foregoing solution, driving at least one of the pair of cutting blades to reset in the opposite direction of the second direction after the pair of cutting blades open can restore a gap between the cutting blades when cutting the material strip, thereby ensuring the cutting accuracy of the pair of cutting blades when closing with respect to each other next time.

According to a third aspect, an embodiment of this application proposes a battery manufacturing device. The battery manufacturing device includes:

a delivery apparatus configured to deliver an electrode plate; and the cutting apparatus according to the embodiments of the first aspect of this application, configured to cut the electrode plate.

In the battery manufacturing device of this embodiment of this application, the cutting apparatus is provided with the gap adjustment mechanism, which can reduce the wear of the pair of cutting blades in the process of cutting the material strip, allowing for a long service life, thereby prolonging the service life of the battery manufacturing device.

For additional aspects and advantages of this application, some will be given in the following description, and some will become apparent in the following description or will be understood in the practice of this application.

BRIEF DESCRIPTION OF DRAWINGS

To describe the technical solutions of the embodiments of this application more clearly, the following briefly describes the accompanying drawings required for describing the embodiments. It is appreciated that the accompanying drawings below show merely some embodiments of this application and thus should not be considered as limitations on the scope. Persons of ordinary skill in the art may still derive other related drawings from the accompanying drawings without creative efforts.

Figure 1:
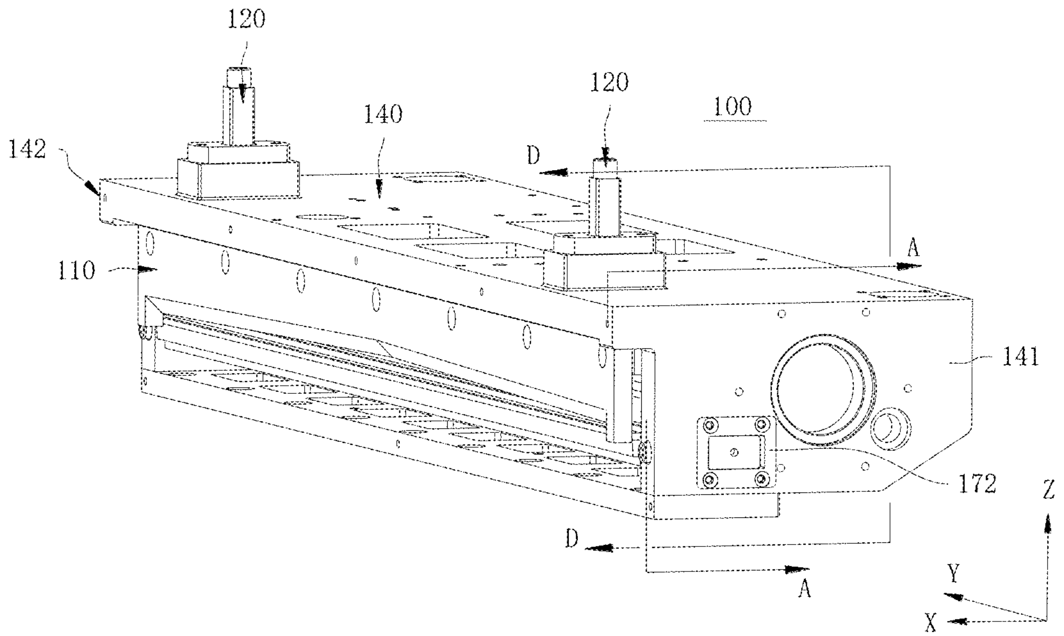
FIG. 1 is an axonometric view of a cutting apparatus according to some embodiments of this application from one perspective.

The accompanying drawings are not necessarily drawn to scale.

Description of reference signs: 1000. battery manufacturing device; 100. cutting apparatus; 110. a pair of cutting blades; 111. first cutting blade; 112. second cutting blade; 120. drive mechanism; 130. gap adjustment mechanism; 131. drive member; 132. elastic reset member; 140. base; 141. first portion; 142. second portion; 143. third portion; 144. mounting hole; 1441. inner wall; 1442. protrusion; 14421. first side; 14422. second side; 1443. first opening; 1444. second opening; 150. guide rod; 151. limiting portion; 160. slider; 161. through hole; 170. guide member; 171. housing; 172. cover; 173. third opening; 180. guide plate; 191. first bracket, 192. second bracket; 193. third bracket; 194. guide assembly; 200. delivery apparatus; Z. first direction; Z1. forward direction of first direction; Z2. opposite direction of first direction; X. second direction; X1. forward direction of second direction; X2. opposite direction of second direction; and Y. third direction.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

In this application, "a plurality of" means more than two (inclusive).

A cutting apparatus includes a pair of cutting blades disposed opposite each other, where the pair of cutting blades are configured to jointly cut electrode plates. The inventors have found that the cutting blade of the cutting apparatus is very prone to wear and its service life is very short. Therefore, to prolong the service life of the cutting blade, the inventors employ cutting blades with higher hardness to avoid premature wear of the cutting blade.

However, the service life of the cutting blade is not greatly prolonged. In view of this, the inventors have found through long-term research that in the process of cutting the electrode plate by the pair of cutting blades, hard dust in an active substance layer of the surface of the electrode plate falls off, and in the process of the pair of cutting blades closing or opening with respect to each other, the hard dust is interspersed in a gap between the pair of cutting blades, resulting in the wear of the surface of the pair of cutting blades. This causes the cutting blade to be very prone to wear in the long run and in turn greatly shortens the service life of the cutting apparatus.

In view of the foregoing findings, the inventors consider enlarging a movement gap between the pair of cutting blades in the process of opening to avoid the wear of the surface of the pair of cutting blades due to the hard dust in the cutting process, thereby prolonging the service life of the cutting apparatus.

Based on the foregoing idea, this application provides a new technical solution to enlarge the movement gap between the pair of cutting blades before the pair of cutting blades reset, so as to avoid the wear of the pair of cutting blades in a process of resetting, thereby prolonging the service life of the cutting apparatus.

In view of this, this application proposes a cutting apparatus and cutting method for cutting electrode plates, so as to reduce the degree of wear of the cutting apparatus and prolong the service life of the cutting apparatus.

Figure 2:
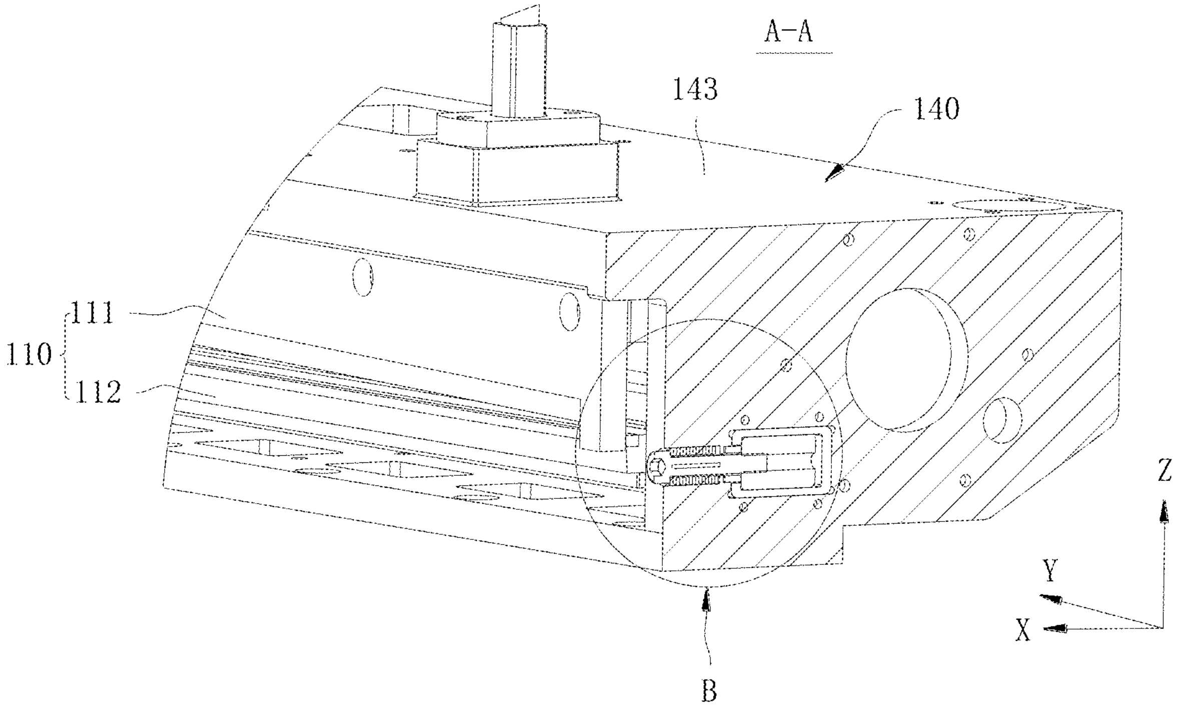
FIG. 2 is a cross-sectional view along direction A-A in FIG. 1.
Figure 3:
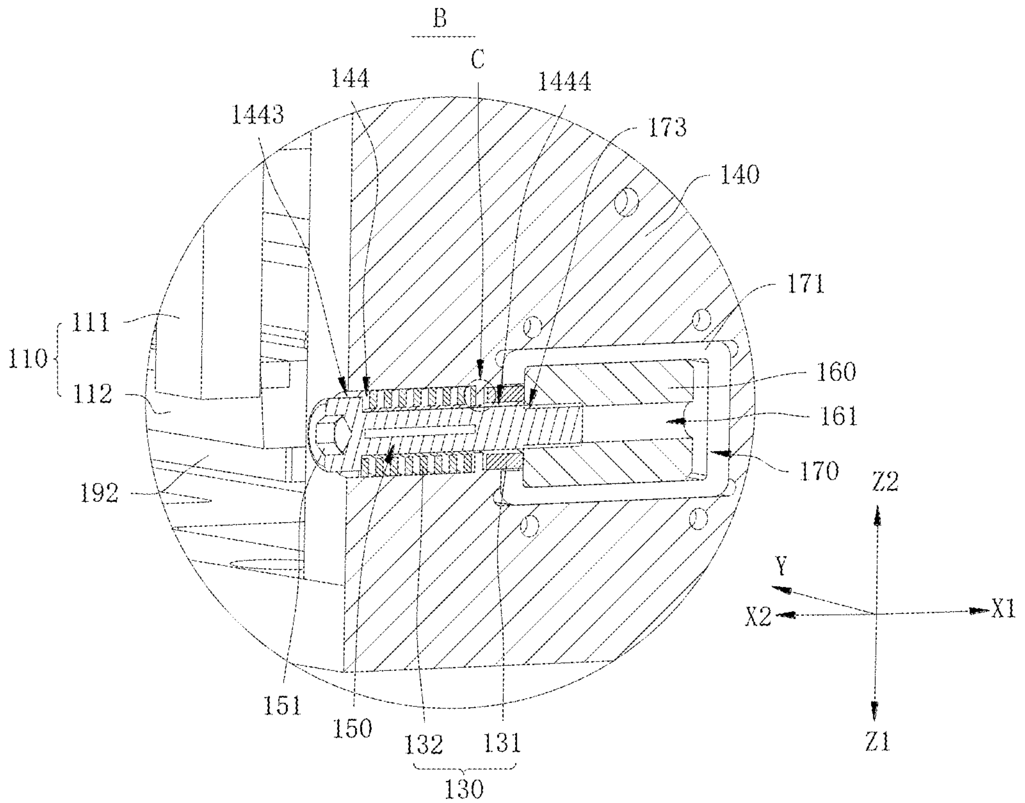
FIG. 3 is a locally enlarged view of location B in FIG. 2.

FIG. 1 is an axonometric view of a cutting apparatus according to some embodiments of this application from one perspective. FIG. 2 is a cross-sectional view along direction A-A in FIG. 1. FIG. 3 is a locally enlarged view of location B in FIG. 2.

As shown in FIGS. 1, 2, and 3, some embodiments of this application propose a cutting apparatus 100 including a pair of cutting blades 110, a drive mechanism 120, and a gap adjustment mechanism 130. The drive mechanism 120 is configured to drive the pair of cutting blades 110 to close or open with respect to each other in a first direction Z. The gap adjustment mechanism 130 is configured to drive at least one of the pair of cutting blades 110 to move along a second direction X before the drive mechanism 120 drives the pair of cutting blades 110 to open, so as to enlarge a movement gap between the pair of cutting blades 110. The first direction Z intersects with the second direction X.

The pair of cutting blades 110 closing with respect to each other in the first direction Z refers that the pair of cutting blades 110 approach each other in the first direction Z to cut a material strip. The pair of cutting blades 110 opening with respect to each other in the first direction Z refers to that blades of the pair of cutting blades 110 leave each other in the first direction Z to reset for cutting a material strip next time.

There are various implementations for the pair of cutting blades 110 closing or opening with respect to each other in the first direction Z. It may be that one of the pair of cutting blades 110 approaches or leaves the other along the first direction Z or two cutting blades move in opposite directions at the same time.

The movement gap between the pair of cutting blades 110 is a gap between the surfaces of the pair of cutting blades 110 approaching each other along the second direction X.

There are various embodiments of one of the pair of cutting blades 110 moving along the second direction X to enlarge the movement gap between the pair of cutting blades 110. For example, it may be that one of the pair of cutting blades 110 leaves the other along the second direction X to enlarge the movement gap between the pair of cutting blades 110 or two cutting blades move in opposite directions at the same time to leave each other.

A thickness direction of the pair of cutting blades 110 may be parallel to the second direction X or inclined to the second direction X. A delivery direction of the material strip may be parallel to the second direction X, so that the cutting apparatus 100 cuts the material strip in a width direction of the material strip. The delivery direction of the material strip may alternatively be inclined to the second direction X, so that the cutting apparatus 100 cuts the material strip in a direction inclined to the width direction of the material strip. The first direction Z and the second direction X may be perpendicular to each other or inclined to each other. The pair of cutting blades 110 may be ordinary cutting blades or ultrasonic cutting blades. The drive mechanism 120 and the gap adjustment mechanism 130 may be electrically controlled drive members to realize automated cutting operations.

In some embodiments of this application, the material strip is an electrode plate, and the electrode plate is used to mold a cell of a battery cell. In another embodiment, the material strip may alternatively be a composite strip formed by laminating the electrode plate with a separator, a metal strip in another form, or a composite strip including a metal interlayer.

In the embodiments of this application, the cutting apparatus 100 is provided with the gap adjustment mechanism 130, so that at least one of the pair of cutting blades 110 can be driven to move along the second direction X before the pair of cutting blades 110 open, so as to enlarge the movement gap between the pair of cutting blades 110. In addition, the pair of cutting blades 110 do not come into contact with each other in the process of opening, so that the wear of the pair of cutting blades 110 in the process of cutting the material strip is reduced, thereby prolonging the service life of the cutting apparatus 100.

In some embodiments of this application, the first direction Z is perpendicular to the second direction X.

The first direction Z may be a horizontal direction, a vertical direction, or another direction. For example, the first direction Z is a vertical direction, the second direction X is a horizontal direction, the material strip is delivered along the horizontal direction, and a thickness direction of the material strip extends along the vertical direction. For another example, the first direction Z is a horizontal direction, the second direction X is a vertical direction, the material strip is delivered along the vertical direction, and the thickness direction of the material strip extends along the horizontal direction.

In the foregoing solution, a direction in which the pair of cutting blades 110 close with respect to each other is perpendicular to an adjustment direction of the movement gap between the cutting blades, allowing for a simple structure of the cutting apparatus 100 and facilitating its design and processing molding.

According to some embodiments of this application, the gap adjustment mechanism 130 is further configured to drive at least one of the pair of cutting blades 110 to reset in an opposite direction X2 of the second direction before the drive mechanism 120 drives the pair of cutting blades 110 to close.

The gap adjustment mechanism 130 is configured to drive at least one of the pair of cutting blades 110 to move along a forward direction X1 of the second direction before the pair of cutting blades 110 open, so as to enlarge the movement gap between the pair of cutting blades 110. The gap adjustment mechanism 130 is further configured to drive at least one of the pair of cutting blades 110 to move along the opposite direction X2 of the second direction after the pair of cutting blades 110 open in place, so as to reset the movement gap between the pair of cutting blades 110.

In the foregoing solution, after the pair of cutting blades 110 close, the gap adjustment mechanism 130 can also drive at least one of the pair of cutting blades 110 to reset, so that the movement gap between the pair of cutting blades 110 is restored to a preset value, allowing the pair of cutting blades 110 to open again with the preset movement gap to cut the material strip, thereby ensuring the cutting quality of the material strip.

As shown in FIGS. 2 and 3, in some embodiments of this application, the pair of cutting blades 110 are a first cutting blade 111 and a second cutting blade 112. The drive mechanism 120 is configured to drive the first cutting blade 111 to reciprocate in the first direction Z. The gap adjustment mechanism 130 is configured to drive the second cutting blade 112 to move along the second direction X and reset in the opposite direction X2 of the second direction.

As shown in FIG. 3, the drive mechanism 120 is configured to: drive the first cutting blade 111 to move along a forward direction Z1 of the first direction so as to approach the second cutting blade 112, allowing the first cutting blade 111 and the second cutting blade 112 to close with respect to each other; and drive the first cutting blade 111 to leave the second cutting blade 112 along an opposite direction Z2 of the first direction, allowing the first cutting blade 111 and the second cutting blade 112 to open. The gap adjustment mechanism 130 is configured to: drive the second cutting blade 112 to move along the forward direction X1 of the second direction so as to enlarge the movement gap between the first cutting blade 111 and the second cutting blade 112; and drive the second cutting blade 112 to move along the opposite direction X2 of the second direction so as to reset the movement gap between the first cutting blade 111 and the second cutting blade 112.

The drive mechanism 120 may be various electrical components capable of driving the first cutting blade 111 to reciprocate linearly, for example, a cylinder, an electrical push rod, a cam mechanism, and a motor.

In the foregoing solution, the first cutting blade 111 reciprocates in the first direction Z to approach or leave the second cutting blade 112, allowing the first cutting blade 111 and the second cutting blade 112 to close or open with respect to each other. The second cutting blade 112 moves along the second direction X to enlarge the movement gap between the first cutting blade 111 and the second cutting blade 112, and resets in the opposite direction X2 of the second direction to restore the gap between the first cutting blade 111 and the second cutting blade 112 to the preset value. The drive mechanism 120 acts on the first cutting blade 111 and the gap adjustment mechanism 130 acts on the second cutting blade 112, allowing for a simple structure of the cutting apparatus 100 and facilitating design and processing molding of the cutting apparatus 100.

In another embodiment, the drive mechanism 120 and the gap adjustment mechanism 130 can act separately on the first cutting blade 111 or the second cutting blade 112. Alternatively, the first cutting blade 111 and the second cutting blade 112 are respectively provided with the corresponding drive mechanism 120 and gap adjustment mechanism 130. In one implementation, along the delivery direction of the material strip, the first cutting blade 111 is located downstream from the second cutting blade 112. After the first cutting blade 111 and the second cutting blade 112 close with respect to each other to cut the material strip, a fracture of the material strip is flush with the second cutting blade 112. The gap adjustment mechanism 130 may be configured to drive the first cutting blade 111 to move in a direction leaving the second cutting blade 112, so as to enlarge the movement gap between the pair of cutting blades 110. This can not only avoid the wear between the first cutting blade 111 and the second cutting blade 112, but also avoid the wear between the first cutting blade 111 and a fracture surface of the material strip, further improving the cutting quality of the material strip and the service life of the cutting apparatus 100.

As shown in FIGS. 2 and 3, in some embodiments of this application, the gap adjustment mechanism 130 includes a drive member 131 and an elastic reset member 132. The drive member 131 is configured to drive the second cutting blade 112 to move along the second direction X. The elastic reset member 132 is configured to drive the second cutting blade 112 to reset in the opposite direction X2 of the second direction.

The drive member 131 driving the second cutting blade 112 to move along the second direction X refers to that the drive member 131 drives the second cutting blade 112 to move along the forward direction X1 of the second direction. The drive member 131 is a drive mechanism 120 with high accuracy and short response time, for example, a piece of piezoelectric ceramic, an electrical push rod, and a motor screw and nut mechanism. The elastic reset member 132 can accumulate an elastic force when the drive member 131 drives the second cutting blade 112 to move along the forward direction X1 of the second direction, and release the elastic force when the drive member 131 is relieved of force, so as to drive the second cutting blade 112 to reset in the opposite direction X2 of the second direction. The elastic reset member 132 may be a mechanical spring, a gas spring, or the like. The drive member 131 and the elastic reset member 132 may be disposed separately or both mounted to the first cutting blade 111 and/or the second cutting blade 112 through a same connecting member (for example, a guide rod 150 described below).

In the foregoing solution, the drive member 131 drives the second cutting blade 112 to move so as to enlarge the movement gap between the pair of cutting blades 110, so that the movement gap between the pair of cutting blades 110 can be reliably enlarged, preventing the pair of cutting blades 110 from being worn again in the process of opening. The elastic reset member 132 drives the second cutting blade 112 to reset, so that the second cutting blade 112 can be driven to approach the first cutting blade 111 through an elastic force when the drive member 131 is relieved of force, allowing the movement gap to be restored to the preset value. This features simple structure and is easy to implement.

Figure 4:
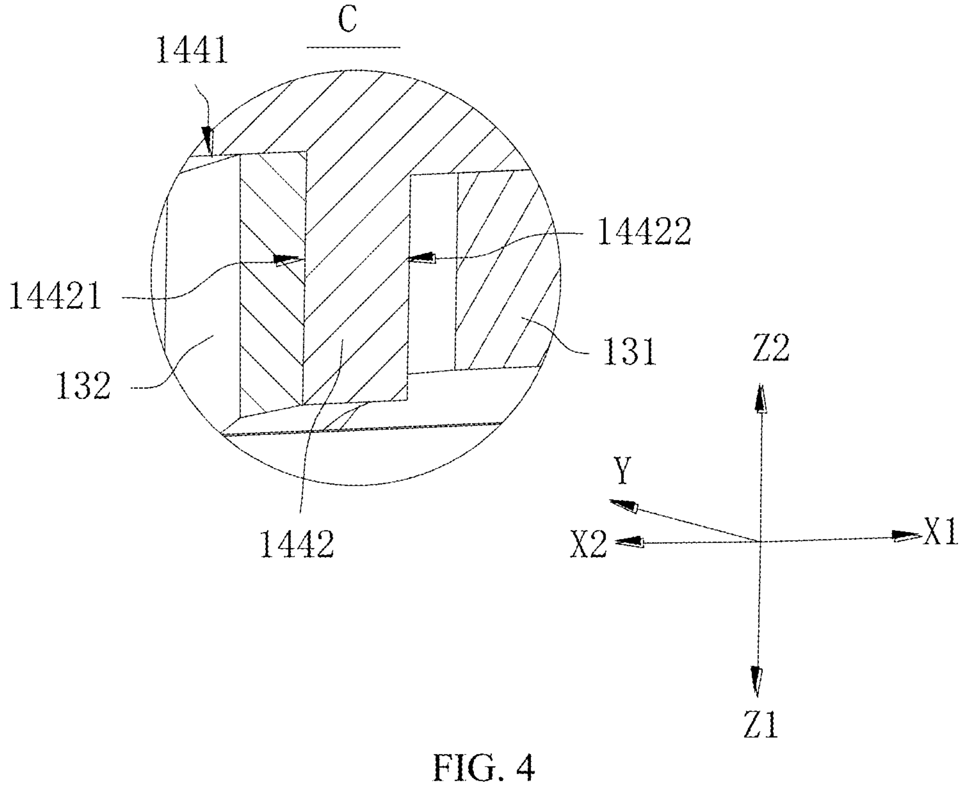
FIG. 4 is a locally enlarged view of location C in FIG. 3.
Figure 5:
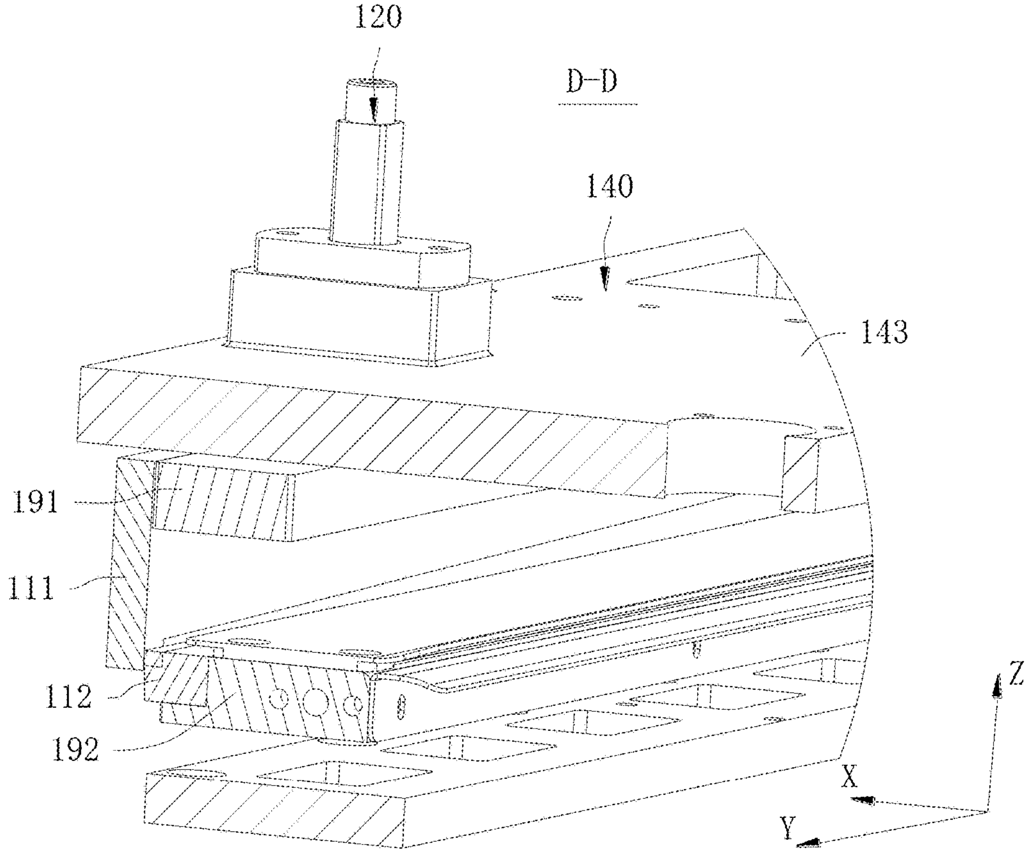
FIG. 5 is a cross-sectional view along direction D-D in FIG. 1.

FIG. 4 is a locally enlarged view of location C in FIG. 3. FIG. 5 is a cross-sectional view along direction D-D in FIG. 1.

As shown in FIGS. 3, 4, and 5, in some embodiments of this application, the cutting apparatus 100 further includes a base 140. The drive mechanism 120 is fixed to the base 140, and the drive mechanism 120 is configured to drive the first cutting blade 111 to move relative to the base 140. The second cutting blade 112 is slidably mounted to the base 140 along the second direction X. The gap adjustment mechanism 130 is configured to drive the second cutting blade 112 to move relative to the base 140.

The base 140 is configured to be fixedly connected with an external frame and configured for mounting the drive mechanism 120, the first cutting blade 111, and the second cutting blade 112.

As shown in FIG. 5, the cutting apparatus 100 further includes a first bracket 191 and a second bracket 192. The first cutting blade 111 is fixed to the first bracket 191, and the first bracket 191 is mounted at an actuating end of the drive mechanism 120, so as to mount the first cutting blade 111 at the actuating end of the drive mechanism 120. The second cutting blade 112 is fixed to the second bracket 192, and the second bracket 192 is in sliding fit with the base 140 in the second direction X, so as to allow the second cutting blade 112 to be slidably mounted to the base 140 along the second direction X.

The gap adjustment mechanism 130 may be fixed to the base 140 and its actuating end drives the second bracket 192 to move along the forward direction X1 of the second direction. The gap adjustment mechanism 130 may alternatively abut against between the base 140 and the second bracket 192, and the gap adjustment mechanism 130 itself changes in the length in the second direction X to drive the second bracket 192 to move relative to the base 140 along the forward direction X1 of the second direction.

In the foregoing solution, the drive mechanism 120 and the second cutting blade 112 are both mounted to the base 140, enabling the cutting apparatus 100 to be connected to the external frame through the base 140 and reducing the difficulty of connecting the cutting apparatus 100 to the external frame.

As shown in FIG. 3, in some embodiments of this application, the base 140 is provided with a mounting hole 144. The cutting apparatus 100 further includes a guide rod 150. The guide rod 150 extends along the second direction X, and the guide rod 150 slidably runs through the mounting hole 144. One end of the guide rod 150 is connected to the second cutting blade 112. The drive member 131 fits around the guide rod 150.

A cross section of the guide rod 150 may be circular, oval, or rectangular. The guide rod 150 is fixedly connected to the second bracket 192 so as to be connected to the second cutting blade 112 through the second bracket 192. The guide rod 150 is used for mounting the drive member 131.

As shown in FIG. 1, the base 140 includes a first portion 141, a second portion 142, and a third portion 143. The first portion 141 and the second portion 142 are apart from each other in a third direction Y. The third portion 143 connects the first portion 141 and the second portion 142. The first portion 141, the second portion 142, and the third portion 143 together enclose a cavity. The drive mechanism 120 is mounted to the third portion 143. The second bracket 192 and the second cutting blade 112 are accommodated in the cavity. Two ends of the second bracket 192 in the third direction Y are respectively in sliding fit with the first portion 141 and the second portion 142 in the second direction X. The third direction Y is perpendicular to the first direction Z and the second direction X. Length directions of the first cutting blade 111 and the second cutting blade 112 both extend along the third direction Y.

As shown in FIG. 3, the mounting hole 144 runs through the first portion 141 along the second direction X. Specifically, two ends of the mounting hole 144 are respectively provided with a first opening 1443 and a second opening 1444. The first opening 1443 is exposed on the surface of the first portion 141, and the second opening 1444 may be exposed on the surface of the first portion 141 or the wall of a groove on the first portion 141. One end of the guide rod 150 is exposed on the surface of the first portion 141 from the first opening 1443, and another end thereof extends out of the second opening 1444 to be fixedly connected to the second bracket 192. The another end of the guide rod 150 may be directly connected to the second bracket 192 or indirectly connected to the second bracket 192 through a connecting member in between.

The drive member 131 may be entirely exposed on the outside of mounting hole 144 and its two ends respectively abut against the outer surface of the base 140 and the second bracket 192. The drive member 131 may alternatively be at least partially accommodated in the mounting hole 144 and abut against a partial structure (that is, a protrusion 1442 described below) of the base 140 in the mounting hole 144.

In the foregoing solution, the guide rod 150 is fixedly connected to the second cutting blade 112, and the guide rod 150 is slidably mounted to the base 140. In this way, when driving the second cutting blade 112 to move relative to the base 140, the drive member 131 can limit the movement of the second cutting blade 112 along the second direction X. In addition, the drive member 131 fits around the guide rod 150, allowing the drive member 131 to drive the second cutting blade 112 along the second direction X to move relative to the base 140. This features simple structure and convenient assembly.

As shown in FIG. 3, in some embodiments of this application, the guide rod 150 is provided with a limiting portion 151 at the another end, the elastic reset member 132 fits around the guide rod 150, and two ends of the elastic reset member 132 respectively abut against the limiting portion 151 and the base 140.

The guide rod 150 may be a bolt. The bolt includes a head portion and a rod portion, where the head portion is constructed as the limiting portion 151. The elastic reset member 132 and the drive member 131 both fit around the rod portion. The tail end of the rod portion is in thread fit with the second bracket 192. The guide rod 150 may alternatively be a rod having an annular boss. The annular boss is constructed as the limiting portion 151. An end of the rod is threaded or snap-fitted with the second bracket 192.

The elastic reset member 132 may be entirely exposed on the outside of base 140. One end of the elastic reset member 132 abuts against the limiting portion 151, and the other end thereof abuts against the outer surface of the base 140. The elastic reset member 132 may alternatively be at least partially accommodated in the mounting hole 144 and abut against a partial structure (that is, a protrusion 1442 described below) of the base 140 in the mounting hole 144.

In the foregoing solution, the elastic reset member 132 fits around the guide rod 150, so that the elastic reset member 132 can abut against between the limiting portion 151 and the base 140 in the second direction X, and thus the elastic reset member 132 acts on the limiting portion 151 to drive the second cutting blade 112 fixedly connected to the guide rod 150 to reset in the opposite direction of the second direction X.

As shown in FIGS. 3 and 4, in some embodiments of this application, the elastic reset member 132 and the drive member 131 are both disposed in the mounting hole 144. A protrusion 1442 is provided on an inner wall 1441 of the mounting hole 144, and two sides of the protrusion 1442 respectively abut against the elastic reset member 132 and the drive member 131.

Specifically, in the second direction X, the guide rod 150 is exposed on the outer surface of the base 140 from the first opening 1443 to abut against the elastic reset member 132 through the limiting portion 151, or the guide rod 150 is exposed on the outer surface of the base 140 from the second opening 1444 to be connected to the second bracket 192. In the second direction X, two sides of the protrusion 1442 are a first side 14421 and a second side 14422 respectively. The first side 14421 faces the first opening 1443, and the second side 14422 faces the second opening 1444. One end of the drive member 131 abuts against the second side 14422, and the other end thereof abuts against the second bracket 192 directly or indirectly. The two ends of the elastic reset member 132 respectively abut against between the limiting portion 151 and the first side 14421.

In the foregoing solution, the protrusion 1442 is provided on the inner wall 1441 of the mounting hole 144, and the two sides of the protrusion 1442 respectively abut against the elastic reset member 132 and the drive member 131. This allows the elastic reset member 132 and the drive member 131 to be both accommodated in the mounting hole 144, ensuring a compact structure for the gap adjustment mechanism 130 that occupies a small space. In addition, one end of the elastic reset member 132 and one end of the drive member 131 both abut against the protrusion 1442 for a direct contact with the base 140.

According to some embodiments of this application, the protrusion 1442 is an annular protrusion 1442 extending along a circumferential direction of the mounting hole 144.

An axial direction of the mounting hole 144 is parallel to the first direction Z. The circumferential direction of the mounting hole 144 is a direction extending around the axial direction of the mounting hole 144. The guide rod 150 runs through the protrusion 1442 along the second direction X. The drive member 131 and the elastic reset member 132 both abut against protrusion 1442 for a direct contact with the base 140.

In the foregoing solution, the protrusion 1442 is set as the annular protrusion 1442 extending along the circumferential direction of the mounting hole 144, allowing one end of the elastic reset member 132 and one end of the drive member 131 to both abut against the protrusion 1442 uniformly in the circumferential direction of the mounting hole 144.

In another embodiment, the protrusion 1442 may alternatively be provided in a plurality. The plurality of protrusions 1442 are spaced apart in the circumferential direction of the mounting hole 144.

As shown in FIG. 3, in some embodiments of this application, the cutting apparatus 100 further includes a slider 160 and a guide member 170. The slider 160 is fixed to the second cutting blade 112. The guide member 170 is fixed to the base 140 and fits with the slider 160, and the guide member 170 is configured to guide the slider 160 to move along the second direction X. One end of the guide rod 150 is connected to the slider 160.

Specifically, the slider 160 is fixedly connected to the second bracket 192, and the slider 160 is provided with a through hole 161 extending along the first direction Z. The guide rod 150 is inserted into the through hole 161 and is in thread fit with the through hole 161, so that the guide rod 150 is fixedly connected to the second cutting blade 112 through the slider 160. The first portion 141 of the base 140 is further provided with a groove running along the third direction Y. The slider 160 is disposed in the groove. The second opening 1444 of the mounting hole 144 is exposed on the wall of the groove.

The guide member 170 is fixedly connected to the base 140, and the guide member 170 is in sliding fit with the slider 160 in the second direction X. The guide member 170 includes a housing 171 and a cover 172 (refer to FIG. 1). The housing 171 and the cover 172 are mounted on two sides of the first portion 141 in the third direction Y. The housing 171 is fixedly disposed in the groove, the housing 171 is provided with a third opening 173 corresponding to the second opening 1444 of the mounting hole 144, and the housing 171 is provided with an accommodating cavity. The slider 160 is slidably mounted in the accommodating cavity along the second direction X and its sliding limit position is limited by the inner wall 1441 of the accommodating cavity. One end of the drive member 131 extends into the accommodating cavity through the third opening 173 so as to abut against the slider 160.

The housing 171 is disposed in a cavity of the base 140, and the cover 172 is connected to the base 140 through a threaded member from an outer side of the base 140, to seal the slider 160 in the accommodating cavity of the housing 171.

The guide rod 150, the gap adjustment mechanism 130, the slider 160, and the guide member 170 are constructed to form a gap adjustment unit. The gap adjustment unit not only realizes a sliding fit between the base 140 and the second cutting blade 112 along the second direction X, but also is capable of driving the second cutting blade 112 to move relative to the base 140 along the second direction X. In some embodiments of this application, the gap adjustment unit is provided in two. One gap adjustment unit is provided on the first portion 141, and the other gap adjustment unit is provided on the second portion 142. The two gap adjustment units synchronously drive the second bracket 192 to move along the second direction X by driving two ends of the second bracket 192 in the third direction Y respectively. In another embodiment, the gap adjustment unit may alternatively be provided in only one. The first portion 141 is mounted with the gap adjustment unit. The second portion 142 is in sliding fit with the base 140 only through the slider 160 and the guide member 170, with no corresponding gap adjustment mechanism 130 provided.

In the foregoing solution, the second cutting blade 112 is in sliding fit with the guide member 170 in the second direction X through the slider 160, which can simply and reliably implement a sliding fit between the second cutting blade 112 and the base 140.

In another embodiment, the second bracket 192 may alternatively be in sliding fit with the base 140 through a guide rail assembly.

According to some embodiments of this application, the drive member 131 is a piece of piezoelectric ceramic.

The piezoelectric ceramic is capable of undergoing mechanical deformation under the action of voltage by using its material properties and undergoing polarization due to relative displacement of internal positive and negative charge centers under the action of mechanical stress, that is, it has a piezoelectric effect. The piezoelectric ceramic can be lengthened in an energized state in a distribution direction (that is, the second direction X) of the two electrodes and shortened to its original size in a de-energized state.

As shown in FIG. 3, the piezoelectric ceramic is sleeve-shaped, the piezoelectric ceramic fits around the guide rod 150, and two ends of the piezoelectric ceramic respectively abut against the protrusion 1442 and the slider 160. The piezoelectric ceramic is lengthened in the energized state to drive the second bracket 192 to move along the forward direction X1 of the second direction, so as to enlarge the movement gap between the first cutting blade 111 and the second cutting blade 112. The piezoelectric ceramic is shortened in the de-energized state to release the second cutting blade 112, such that the second cutting blade 112 resets in the opposite direction X2 of the second direction under the action of the elastic reset member 132.

In the foregoing solution, the piezoelectric ceramic undergoes tiny deformation under the action of an electric field, has quick response, and can implement high-accuracy gap adjustment in a short time and drive the second cutting blade 112 to move with high accuracy in a timely manner, so as to accurately enlarge the movement gap between the pair of cutting blades 110.

Figure 6:
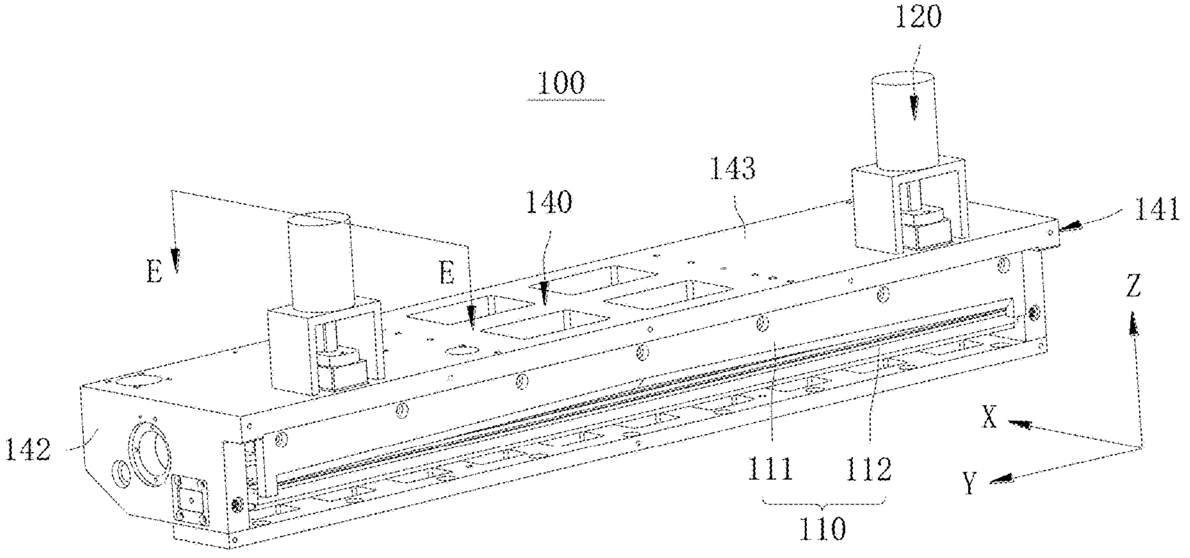
FIG. 6 is an axonometric view of a cutting apparatus according to some embodiments of this application from another perspective.
Figure 7:
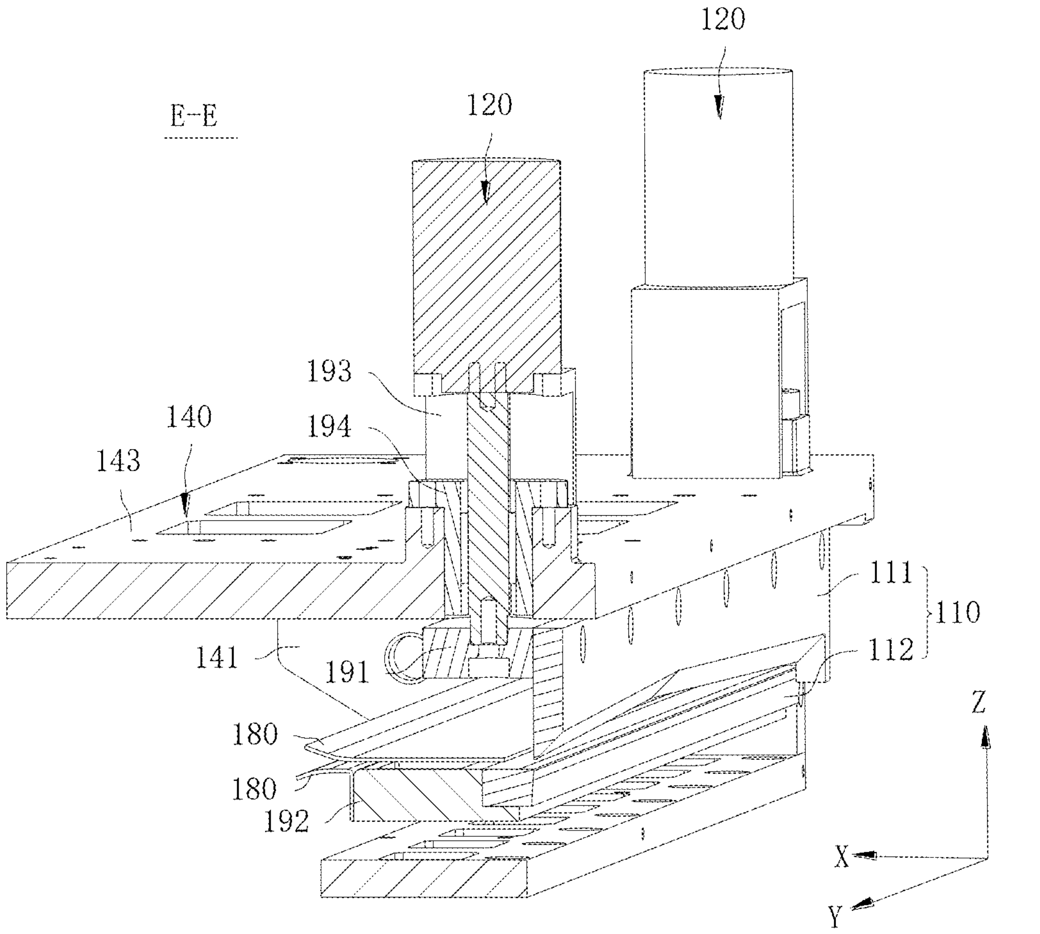
FIG. 7 is a cross-sectional view along direction E-E in FIG. 6.

FIG. 6 is an axonometric view of a cutting apparatus according to some embodiments of this application from another perspective. FIG. 7 is a cross-sectional view along direction E-E in FIG. 6.

As shown in FIGS. 6 and 7, in some embodiments of this application, the cutting apparatus 100 further includes a guide plate 180. The guide plate 180 is fixed to the second cutting blade 112 and configured to guide the material strip into the gap between the first cutting blade 111 and the second cutting blade 112.

The guide plate 180 is disposed on an incoming side of the pair of cutting blades 110 and configured to correct the delivery direction of the material strip before the material strip enters the gap between the first cutting blade 111 and the second cutting blade 112, so that the material strip is delivered along the second direction X and its thickness direction is parallel to the first direction Z.

The guide plate 180 may be provided in two. One guide plate 180 is fixed to the first portion 141 of the base 140, and the other guide plate 180 is fixed to the second bracket 192. A gap for the material strip to run through is formed between the two guide plates 180. In the second direction X, for the two guide plates 180, one end is close to the pair of cutting blades 110, and a flaring is formed on the other end to guide the material strip into the gap between the two guide plates 180.

The guide plate 180 may alternatively be provided in only one. The guide plate 180 is fixed to the second bracket 192 and configured to guide the material strip into the gap between the pair of cutting blades 110.

In the foregoing solution, the guide plate 180 can guide the material strip into the gap between the first cutting blade 111 and the second cutting blade 112, so that the first cutting blade 111 and the second cutting blade 112 cut the material strip in the thickness direction of the material strip, thereby reducing the area of a cut section of the material strip and improving the cutting quality of the material strip.

In some embodiments of this application, the drive mechanism 120 is a voice coil motor.

The voice coil motor, as a direct drive motor, generates a force internally by placing an energized coil in a magnetic field, and can achieve high-speed reciprocating linear motion.

The cutting apparatus 100 further includes a third bracket 193 and a guide assembly 194. The third bracket 193 is fixed to the third portion 143 of the base 140. The drive mechanism 120 is fixed to the third bracket 193. The third portion 143 of the base 140 is provided with an opening extending along the first direction Z. The guide assembly 194 is fixed at the opening of the base 140. An output shaft of the voice coil motor passes through an inner hole of the guide assembly 194 to be connected to the first bracket 191 through the threaded member. The voice coil motor is capable of driving the first bracket 191 to reciprocate in the first direction Z so as to drive the first cutting blade 111 to reciprocate in the first direction Z.

In the foregoing solution, with the advantages of small size, high speed, and high acceleration response, the voice coil motor can not only occupy a small installation space, but also drive the first cutting blade 111 with high accuracy to reciprocate at a high speed in the first direction Z. This can not only improve the cutting efficiency of the material strip, but also reduce the amount of metal dust generated in the cutting process due to a high-speed cutting condition, thereby improving the cutting quality of the material strip and prolonging the service life of the cutting apparatus 100.

As shown in FIGS. 6 and 7, in some embodiments of this application, the drive mechanism 120 is provided in two. The two drive mechanisms 120 are apart from each other in the third direction Y, the third direction Y being perpendicular to the first direction Z and the second direction X.

Length directions of the first cutting blade 111 and the second cutting blade 112 both extend along the third direction Y. Each drive mechanism 120 is mounted to the base 140 through one third bracket 193 and one guide assembly 194.

In the foregoing solution, the two drive mechanisms 120 are apart from each other in the third direction Y, which can apply a uniform force to the first cutting blade 111 in the third direction Y, avoiding that the first cutting blade 111 skews due to a non-uniform force applied in the third direction Y, which in turn reduces the cutting quality of the material strip.

Figure 8:
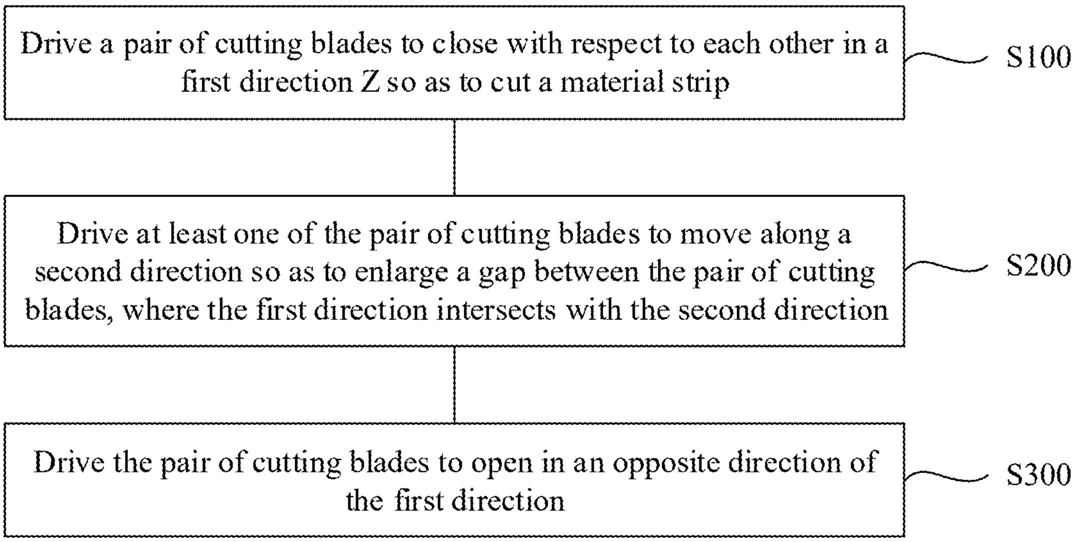
FIG. 8 is a flowchart of a first implementation of a cutting method according to some embodiments of this application.
Figure 9:
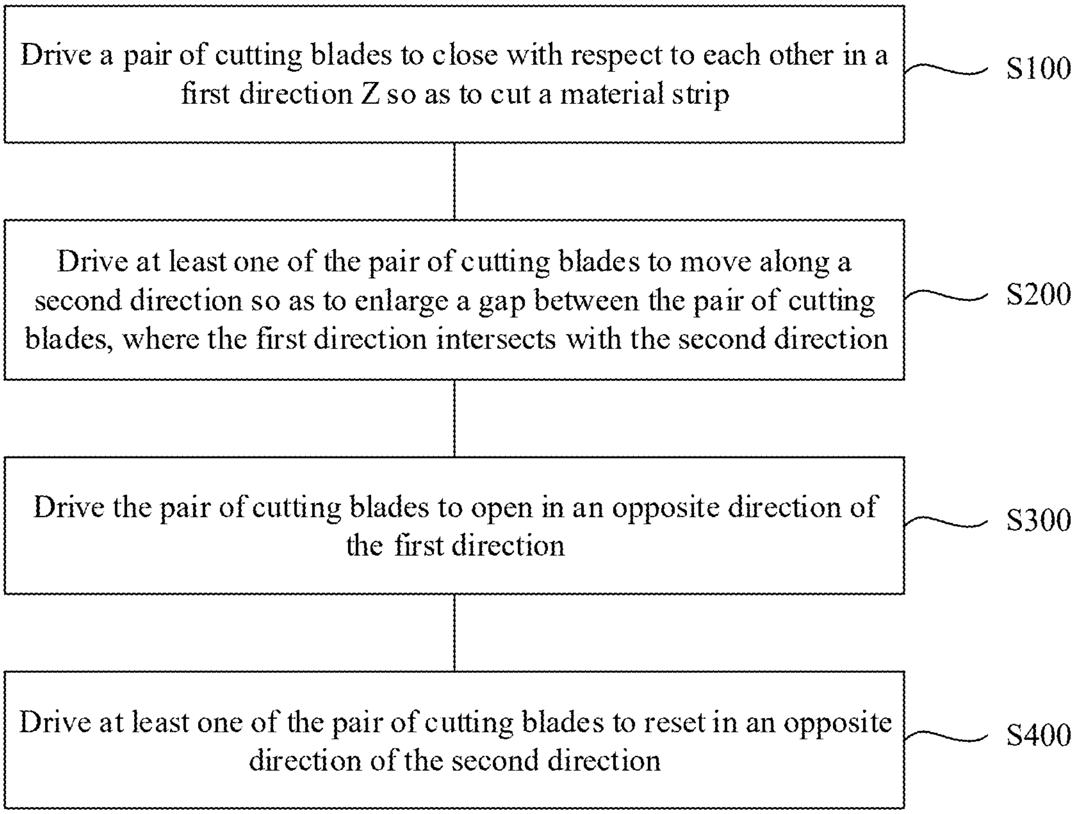
FIG. 9 is a flowchart of a second implementation of a cutting method according to some embodiments of this application.

FIG. 8 is a flowchart of a first implementation of a cutting method according to some embodiments of this application. FIG. 9 is a flowchart of a second implementation of a cutting method according to some embodiments of this application.

As shown in FIG. 8, some embodiments of this application propose a cutting method. The cutting method includes the following steps.

S100: Drive a pair of cutting blades 110 to close with respect to each other in a first direction Z so as to cut a material strip.

S200: Drive at least one of the pair of cutting blades 110 to move along a second direction X so as to enlarge a movement gap between the pair of cutting blades 110, where the first direction Z intersects with the second direction X.

S300: Drive the pair of cutting blades 110 to open in an opposite direction Z2 of the first direction.

It can be understood that the cutting method according to some embodiments of this application may be implemented using, but not limited to, the cutting apparatus 100 according to some embodiments of this application. The cutting method according to some embodiments of this application is specifically described below in connection with the cutting apparatus 100 according to some embodiments of this application.

In some embodiments of this application, in S100: Drive a pair of cutting blades 110 to close with respect to each other in a first direction Z so as to cut a material strip, the step includes:

S110: A first cutting blade 111 switches between an extension position and a retraction position in the first direction Z. When a drive mechanism 120 drives the first cutting blade 111 to move to the extension position along a forward direction Z1 of the first direction, the pair of cutting blades 110 close with respect to each other, and then the drive mechanism 120 transmits an extension signal.

In some embodiments of this application, in S200: Drive at least one of the pair of cutting blades 110 to move along a second direction X so as to enlarge a movement gap between the pair of cutting blades 110, where the first direction Z intersects with the second direction X, the step includes:

S210: A drive member 131 responds to the extension signal and is energized to extend along the second direction X so as to drive a second cutting blade 112 to move relative to the base 140 along a forward direction X1 of the second direction, so as to enlarge the movement gap between the first cutting blade 111 and the second cutting blade 112.

In some embodiments of this application, in S300: Drive the pair of cutting blades 110 to open in an opposite direction Z2 of the first direction, the step includes:

S310: The drive member 131 drives the second cutting blade 112 to move in place along the forward direction X1 of the second direction and then transmits an in-place signal. The drive mechanism 120 responds to the in-place signal and drives the first cutting blade 111 to move to the retraction position along the opposite direction Z2 of the first direction, such that the pair of cutting blades 110 open.

In the process of cutting the material strip by using the cutting method according to the embodiments of this application, the movement gap between the pair of cutting blades 110 is enlarged before the pair of cutting blades 110 open, so that the pair of cutting blades 110 do not come into contact with each other in the process of opening, and the wear of the pair of cutting blades 110 in the process of cutting the material strip is reduced, thereby prolonging the service life of the cutting apparatus 100.

As shown in FIG. 8, in some embodiments of this application, after S300: Drive the pair of cutting blades 110 to open along the opposite direction Z2 of the first direction, the cutting method further includes the following step.

S400: Drive at least one of the pair of cutting blades 110 to reset in an opposite direction X2 of the second direction.

Further, in S200: Drive at least one of the pair of cutting blades 110 to move along a second direction X so as to enlarge a movement gap between the pair of cutting blades 110, where the first direction Z intersects with the second direction X, the step includes:

S220: An elastic reset member 132 is compressed along the second direction X to accumulate an elastic force.

Further, in S300: Drive the pair of cutting blades 110 to open along an opposite direction Z2 of the first direction, the step further includes:

S320: The drive mechanism 120 transmits a retraction signal when driving the first cutting blade 111 to move to the retraction position along the opposite direction Z2 of the first direction.

Further, in S400: Drive at least one of the pair of cutting blades 110 to reset in an opposite direction of the second direction X, the step includes:

S410: The drive member 131 responds to the retraction signal and is de-energized, and then restores its original length to release the second cutting blade 112.

S420: The elastic reset member 132 restores deformation in the second direction X and drives, by using its elastic force, the second cutting blade 112 to reset in the opposite direction of the second direction X.

In the foregoing solution, driving at least one of the pair of cutting blades 110 to reset in the opposite direction of the second direction X after the pair of cutting blades 110 open can restore a gap between the cutting blades when cutting the material strip, thereby ensuring the cutting accuracy of the pair of cutting blades 110 when closing with respect to each other next time.

Figure 10:
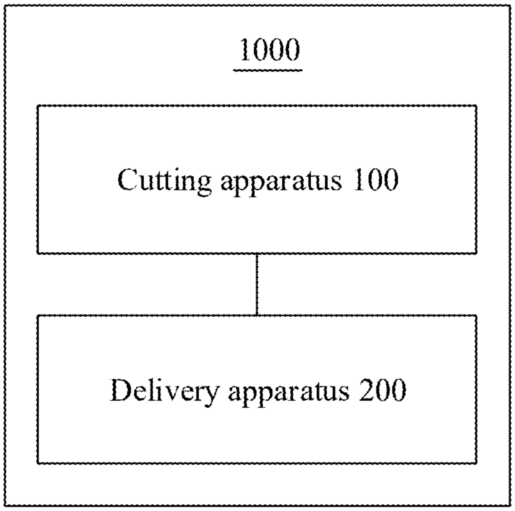
FIG. 10 is a schematic structural diagram of a battery manufacturing device according to some embodiments of this application.

FIG. 10 is a schematic structural diagram of a battery manufacturing device according to some embodiments of this application.

As shown in FIG. 10, some embodiments of this application propose a battery manufacturing device 1000 including a cutting apparatus 100 and a delivery apparatus 200. The delivery apparatus 200 is configured to deliver an electrode plate. The cutting apparatus 100 is configured to cut the electrode plate.

In the battery manufacturing device 1000 according to the embodiments of this application, the cutting apparatus 100 is provided with a gap adjustment mechanism 130, which can reduce the wear of a pair of cutting blades 110 in a process of cutting a material strip, allowing for a long service life, thereby prolonging the service life of the battery manufacturing device 1000.

As shown in FIGS. 1 to 10, some embodiments of this application propose a cutting apparatus 100. The cutting apparatus 100 includes a pair of cutting blades 110, a drive mechanism 120, a gap adjustment mechanism 130, a base 140, a sliding assembly, a guide rod 150, a first bracket 191, a second bracket 192, a third bracket 193, and a guide assembly 194. The pair of cutting blades 110 include a first cutting blade 111 and a second cutting blade 112 disposed opposite each other. The first cutting blade 111 is mounted to the first bracket 191. The second cutting blade 112 is mounted to the second bracket 192. The drive mechanism 120 is a voice coil motor, and the drive mechanism 120 is fixed to the base 140 through the third bracket 193. The base 140 is further mounted with the guide assembly 194, the guide assembly 194 being a roller guide sleeve. An output shaft of the drive mechanism 120 passes through the guide assembly 194 and moves along a first direction Z under the limit of the guide assembly 194. The drive mechanism 120 is provided in two. The two drive mechanisms 120 are apart from each other in a third direction Y. Output shafts of the two drive mechanisms 120 are both connected to the first bracket 191 so as to jointly drive the first cutting blade 111 to reciprocate in the first direction Z. Two ends of the second bracket 192 in the third direction Y are respectively slidably mounted to the base 140 along a second direction X through one sliding assembly. The sliding assembly includes a slider 160 and a guide member 170. The guide member 170 is mounted to the base 140. The slider 160 is slidably mounted to the guide member 170 along the second direction X, and a sliding limit position of the slider 160 is limited by an inner wall of the guide member 170. The base 140 is provided with a mounting hole 144. A protrusion 1442 is provided on the inner wall of the mounting hole 144. The guide rod 150 runs through the mounting hole 144 along the second direction X. The guide rod 150 is a bolt. A head portion of the bolt is formed as a limiting portion 151, and a tail end of the bolt is in thread fit with the slider 160. The gap adjustment mechanism 130 includes a drive member 131 and an elastic reset member 132. The drive member 131 is a piece of precision piezoelectric ceramic. The elastic reset member 132 is a straight spring. The drive member 131 and the elastic reset member 132 both fit around the guide rod 150. The drive member 131 abuts against between the protrusion 1442 and the slider 160. The elastic reset member 132 abuts against between the limiting portion 151 and the protrusion 1442.

When the drive mechanism 120 drives the first cutting blade 111 to perform a vertical stroke in a forward direction Z1 of the first direction, the drive member 131 is de-energized and does not operate, and a movement gap suitable for cutting is present between the first cutting blade 111 and the second cutting blade 112 in the second direction X. After the first cutting blade 111 completes the stroke action, the drive member 131 is energized and lengthened to drive the second cutting blade 112 to displace relative to the base 140 in a forward direction X1 of the second direction, and the elastic reset member 132 is compressed, to enlarge the movement gap between the first cutting blade 111 and the second cutting blade 112 in the second direction X. Under a condition that the drive mechanism 131 remains in an energized state, the drive mechanism 120 drives the first cutting blade 111 to start a returning action in an opposite direction Z2 of the first direction. In the returning process, a gap between the first cutting blade 111 and the second cutting blade 112 is enlarged, so that no wear occurs even in a case of hard dust interspersed. At the end of the returning action of the first cutting blade 111, the drive member 131 is de-energized to restore its original length, and the elastic reset member 132 releases an elastic force to drive the second cutting blade 112 to reset for a cutting action next time.

In the cutting apparatus 100 according to the embodiments of this application, the precision piezoelectric ceramic is used as the drive member 131, so that the movement gap between the pair of cutting blades 110 can be quickly adjusted with high accuracy after the pair of cutting blades 110 cuts a material strip, preventing the pair of cutting blades 110 from being worn again in the process of opening and resetting, thereby improving the cutting quality of the material strip and the service life of the cutting apparatus 100.

Although this application has been described with reference to some embodiments, various modifications to this application and replacements of the components therein with equivalents can be made without departing from the scope of this application. In particular, as long as there is no structural conflict, the various technical features mentioned in the implementations can be combined in any manners. This application is not limited to the specific embodiments disclosed in this specification but includes all technical solutions falling within the scope of the claims.

What is claimed is:

1. A cutting apparatus, comprising:

a pair of cutting blades comprising a first cutting blade and a second cutting blade;

a drive mechanism configured to drive the pair of cutting blades to close or open with respect to each other in a first direction; and a gap adjustment mechanism configured to drive the second cutting blade to move along a second direction before the drive mechanism drives the pair of cutting blades to open, so as to enlarge a movement gap between the pair of cutting blades;

wherein:

the first direction intersects with the second direction; and the gap adjustment mechanism comprises an elastic reset member configured to drive the second cutting blade to reset in an opposite direction of the second direction.

2. The cutting apparatus according to claim 1, wherein the first direction is perpendicular to the second direction.

3. The cutting apparatus according to claim 1, wherein the gap adjustment mechanism is further configured to drive at least one of the pair of cutting blades to reset in an opposite direction of the second direction before the drive mechanism drives the pair of cutting blades to close.

4. The cutting apparatus according to claim 3, wherein:

the drive mechanism is configured to drive the first cutting blade to reciprocate in the first direction; and the gap adjustment mechanism is configured to drive the second cutting blade to move along the second direction and reset in the opposite direction of the second direction.

5. The cutting apparatus according to claim 4, wherein the gap adjustment mechanism comprises:

a drive member configured to drive the second cutting blade to move along the second direction.

6. The cutting apparatus according to claim 5, further comprising:

a base;

wherein the drive mechanism is fixed to the base, the drive mechanism is configured to drive the first cutting blade to move relative to the base, the second cutting blade is slidably mounted to the base along the second direction, and the gap adjustment mechanism is configured to drive the second cutting blade to move relative to the base.

7. The cutting apparatus according to claim 6, wherein the base is provided with a mounting hole;

the cutting apparatus further comprising:

a guide rod extending along the second direction, the guide rod slidably running through the mounting hole, and one end of the guide rod being connected to the second cutting blade, wherein the drive member fits around the guide rod.

8. The cutting apparatus according to claim 7, wherein the guide rod is provided with a limiting portion at another end, the elastic reset member fits around the guide rod, and two ends of the elastic reset member respectively abut against the limiting portion and the base.

9. The cutting apparatus according to claim 8, wherein the elastic reset member and the drive member are both disposed in the mounting hole, a protrusion is provided on an inner wall of the mounting hole, and two sides of the protrusion respectively abut against the elastic reset member and the drive member.

10. The cutting apparatus according to claim 9, wherein the protrusion is an annular protrusion extending along a circumferential direction of the mounting hole.

11. The cutting apparatus according to claim 7, further comprising:

a slider fixed to the second cutting blade; and a guide member fixed to the base and fitting with the slider, the guide member being configured to guide the slider to move along the second direction;

wherein one end of the guide rod is connected to the slider.

12. The cutting apparatus according to claim 5, wherein the drive member is a piece of piezoelectric ceramic.

13. The cutting apparatus according to claim 4, further comprising:

a guide plate fixed to the second cutting blade and configured to guide a material strip into a gap between the first cutting blade and the second cutting blade.

14. The cutting apparatus according to claim 1, wherein the drive mechanism is a voice coil motor.

15. The cutting apparatus according to claim 1, wherein the drive mechanism is one of two drive mechanisms of the cutting apparatus, and the two drive mechanisms are apart from each other in a third direction, the third direction being perpendicular to the first direction and the second direction.

16. A battery manufacturing device, comprising:

a delivery apparatus configured to deliver an electrode plate; and the cutting apparatus configured to cut the electrode plate, comprising:

a pair of cutting blades;

a drive mechanism configured to drive the pair of cutting blades to close or open with respect to each other in a first direction; and a gap adjustment mechanism configured to drive at least one of the pair of cutting blades to move along a second direction before the drive mechanism drives the pair of cutting blades to open, so as to enlarge a movement gap between the pair of cutting blades;

wherein the first direction intersects with the second direction.

17. A cutting method, comprising:

driving a pair of cutting blades to close with respect to each other in a first direction so as to cut a material strip;

driving at least one of the pair of cutting blades to move along a second direction so as to enlarge a movement gap between the pair of cutting blades, wherein the first direction intersects with the second direction;

driving the pair of cutting blades to open in an opposite direction of the first direction; and driving at least one of the pair of cutting blades to reset in an opposite direction of the second direction.

* * * * *